Sept. 21, 1926.　　　　H. J. COCKS　　　　1,600,665
FASTENING DEVICE
Filed July 13, 1925
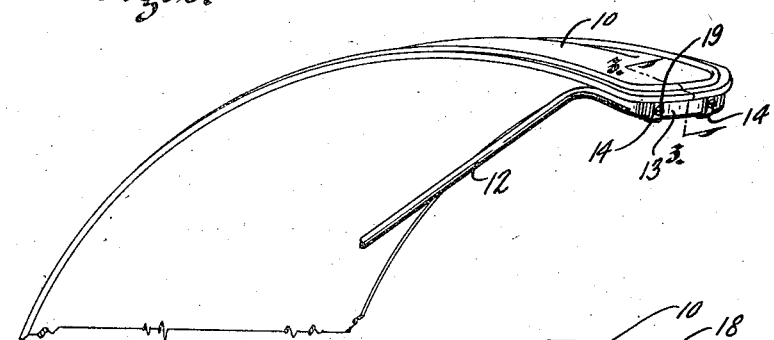
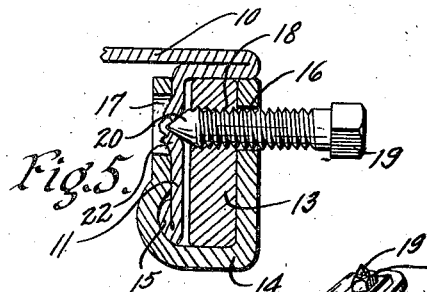
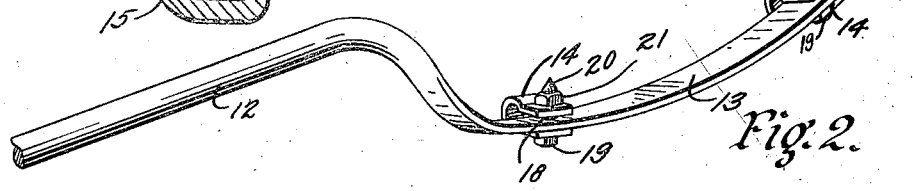
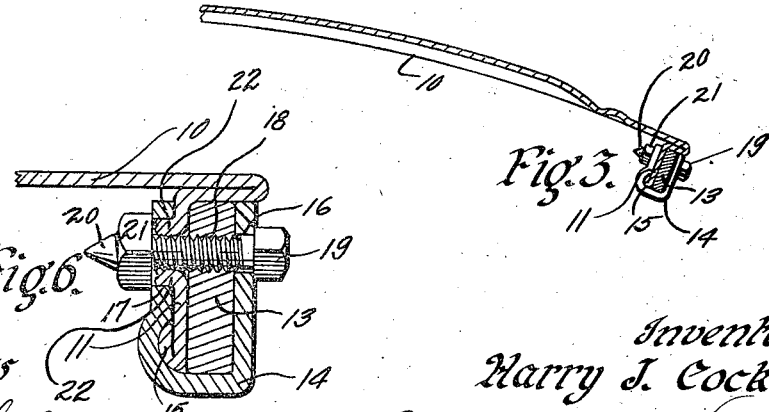
Inventor
Harry J. Cocks
by Bair & Freeman Attorneys
Witness
Ray Rusher Patented Sept. 21, 1926.

1,600,665

UNITED STATES PATENT OFFICE.

HARRY J. COCKS, OF DES MOINES, IOWA, ASSIGNOR TO METAL PRODUCTS COMPANY, OF DES MOINES, IOWA.

FASTENING DEVICE.

Application filed July 13, 1925. Serial No. 43,211.

The object of my invention is to provide a fastening device for securing one member to another member, which device will serve to retain the two separate members in proper position during the time the fastening of one member to the other member takes place.

Still a further object is to provide a U-shaped clip having an opening in each of its sides, one opening being larger than the other opening, and an opening in one of the members to be fastened, which is to be screw-threaded, for receiving a screw-threaded bolt, whereby screwing the bolt within the screw-threads will cause the bolt to puncture the other member, which is to be fastened to the first member, the punctured portion passing into the larger opening in the clip.

Still a further object is to provide in one of the two members to be fastened, a screw-threaded opening for receiving a screw-threaded bolt, and means for retaining the second member to be fastened to the first member during the puncturing of the second member and the passing therethrough of the screw-threaded bolt.

Still, a further object is to provide a device, which is adapted to extend around and receive therebetween a pair of members to be fastened together, one of the members having an opening therein and the other member having an opening punctured therein, while the fastening takes place.

The fastening device may be used for fastening any two members together and is especially adapted for fastening one member already having an opening therein to another member not having an opening, wherein the parts may be positioned, and by simply operating the screw in the first-named member, the second member is punctured for permitting the bolt to pass therethrough, thus connecting the two members securely together.

With these and other objects in view, my invention consists in the construction, arrangement and combination of the various parts of my fastening device, whereby the objects contemplated are attained, as hereinafter more fully set forth, pointed out in my claims, and illustrated in the accompanying drawings, in which:

Figure 1 is a perspective view of a portion of a fender of an automobile with a fender brace attached thereto by means of my fastening device.

Figure 2 is a perspective view of a portion of the fender brace with the fastening device shown thereon.

Figure 3 is a detail, sectional view taken on the line 3—3 of Figure 1.

Figure 4 is a sectional view through the fender flange and fender brace with my improved fastening device shown in the position that it is in just before the fender flange is punctured.

Figure 5 is a view similar to Figure 4, showing the fender flange slightly punctured; and Figure 6 is a view similar to Figure 4, showing the fastening as being fully completed.

In the accompanying drawings, I have used the reference numeral 10 to indicate generally a fender, which is provided with a down-turned fender flange 11.

The particular type of a fender flange here illustrated is that of a Ford automobile.

A fender brace 12 of any suitable kind is secured in any suitable manner to the automobile chassis, and has a flat fender form 13, which conforms to the contour of the fender flange 11 and rests thereagainst.

My device is adapted to connect together the two members, that is, the fender flange 11 and the fender form 13.

Ordinarily, it is necessary to lay the fender form 13 against the fender flange and mark the two openings, or any number of openings necessary, to register with the openings in the fender form, so that a bolt may be inserted therein for connecting the flange 11 to the fender form 13.

My device is designed to prevent the necessity of drilling or punching the opening in the fender flange 11 or from even marking the place where the opening is to be made.

My device consists generally of a U-shaped clip 14, which is designed to extend around and receive therebetween the fender flange 11 and the fender form 13, as clearly illustrated in Figure 4 of the drawings.

The U-shaped clip 14 is adapted to be sprung around the bead 15 on the lower edge of the fender flange.

The U-shaped clip 14 is formed with an opening 16 in one side and an opening 17 in its other side. The opening 17 is larger than the opening 16.

The fender form 13 is formed with a screw-threaded opening 18 into which is received a screw-threaded bolt 19. The bolt 19 extends through the opening 16 in the clip 14.

The end of the screw-threaded bolt 19 is sharpened as at 20, so as to pierce or puncture the fender flange 11, as I will now describe.

The openings 16 and 17, as well as the screw-threaded opening 18, are all in substantial alignment.

The fender flange 11 extends between the side of the clip 14 having the opening 17 therein and one side of the fender form 13. When the bolt 19 is screwed into the screw-threaded opening 18, it will force its sharpened end 20 against the metal of the flange 11 and by continued screwing will cause the flange 11 to be punctured as clearly illustrated in Figure 5 of the drawings.

The enlarged opening 17 permits the bulging and puncturing of the flange 11.

By continued screwing of the bolt 20, it is brought to the position shown in Figure 6 of the drawings, at which time a nut 21 may be mounted upon its projected end.

The ragged or punctured edges 22 of the flange 11 are carried with the bolt into the enlarged opening 17 and serve to prevent the accidental withdrawal or unscrewing of the bolt 19.

It may be here mentioned that in connection with the fastening of a fender brace to a fender, it is always very difficult to puncture and properly locate the position of the opening in the fender flange and with my fastening device, all that is necessary is to insert the fender flange between one side of the clip 14 and one side of the fender form 13, and thereafter simply hold the parts in position, and by screwing the bolt 19 inwardly within the screw-threaded opening 18, I am able to puncture the fender flange and fasten the fender form 13 to the fender flange.

It will thus be seen that it is not necessary to first mark the position of the holes and thereafter punch them out.

It will be further noted that the clip 14 serves to retain the fender flange 11 in position during the time the screw-threaded bolt is puncturing it.

It must be remembered that fenders of automobiles are made of comparatively light material and can not stand much pressure such as is necessary with ordinary drilling or punching of the opening in the flange.

With my device the clip retains the fender flange against any undue movement while the fastening takes place.

In the drawings, I have illustrated the fastening device in connection with a fender and fender brace, although it will be understood that my fastening may be equally as well used in connection with the fastening of one member to another member, where the opening in one member is formed by the fastening itself.

Some changes may be made in the arrangement and construction of the parts of my fastening device, without departing from the real spirit and purpose of my invention, and it is my intention to cover by my claims any modified forms of structure or use of mechanical equivalents which may be reasonably included within their scope.

I claim as my invention:

1. A fastening device for securing one member to another member, comprising a U-shaped clip adapted to extend over the edges of both members and receive them between its sides, said clip having an opening in both of its sides of different diameters, a screw-threaded bolt extended through the smaller of said openings and through a corresponding screw-threaded opening in one of said members, said bolt when moved in said screw-threaded opening forcing itself through and puncturing the other of said members and passing through the larger opening in said clip, as and for the purposes stated.

2. A fastening device for securing one member to another member comprising a plate adapted to rest adjacent one side of one member to which the other member is to be fastened, said plate having an opening therein, one member having a screw-threaded opening for receiving a screw-threaded bolt, the screw-threaded opening being in substantial alignment with the opening in the plate, whereby the screwing of the bolt through said screw-threaded opening will puncture the other member and permit the bolt to pass therethrough and into the opening in said plate.

3. A fastening device for securing one member to another member comprising means for receiving one member and retaining it adjacent the second member while the two members are being fastened together, the second member having a screw-threaded opening, a screw-threaded bolt in said opening, said means having an opening in substantial alignment with the screw-threaded opening, whereby movement of the screw-threaded bolt through the screw-threaded opening will cause the first member to be punctured and permit the bolt to pass into the opening in said means carrying with it the edges of the material of the first member adjacent the puncture, the opening of said means being larger than the screw-threaded opening.

Des Moines, Iowa, June 18, 1925.

HARRY J. COCKS.